C. D. LAWRENCE & J. B. KERR.
Clothes-Wringer.

No. 224,019.  Patented Feb. 3, 1880.

Witnesses:
Sam'l R. Turner
J. B. Holderby

Inventors:
Charles D. Lawrence
Joseph B. Kerr
By R. S. & A. P. Lacey Att'ys

UNITED STATES PATENT OFFICE.

CHARLES D. LAWRENCE AND JOSEPH B. KERR, OF PINE RIVER, WISCONSIN; SAID KERR ASSIGNOR TO THOMAS H. PATTERSON, OF SAME PLACE.

CLOTHES-WRINGER.

SPECIFICATION forming part of Letters Patent No. 224,019, dated February 3, 1880.

Application filed August 11, 1879.

*To all whom it may concern:*

Be it known that we, CHARLES D. LAWRENCE and JOSEPH B. KERR, of Pine River, in the county of Waushara and State of Wisconsin, have invented certain new and useful Improvements in Clothes-Wringers; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has for its object to furnish an improved clothes-wringer, the nature of which will be hereinafter fully explained, and pointed out in the claim.

Figure 1:
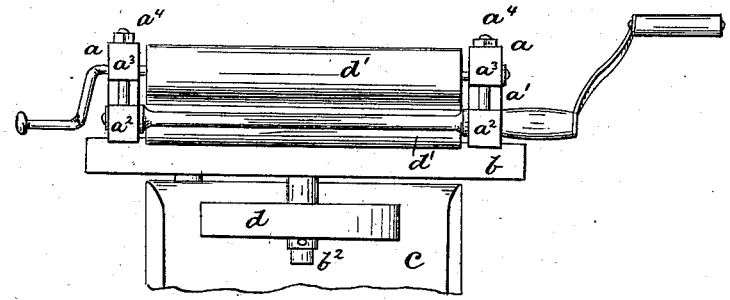
Figure 2:
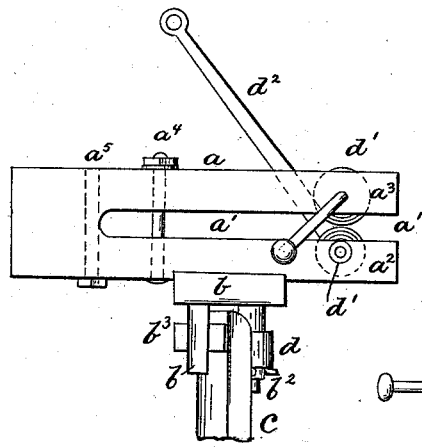
Figure 3:
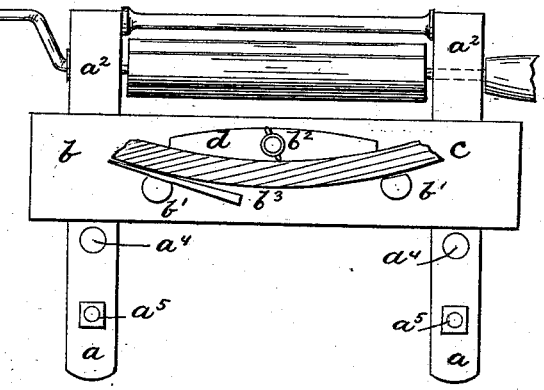

In the drawings, Figure 1 is a side elevation. Fig. 2 is an end elevation of our wringer. Fig. 3 is a bottom view.

$a$ is an end bar, of which there are two, in which the rollers are journaled. It has cut in it the longitudinal slot $a'$, open at one end, as shown. This provides the arms $a^2 a^3$, which have a bolt, $a^4$, put through them near the inner end of slot $a'$. The bar is prevented from splitting by a pin or bolt, $a^5$.

The arms $a^2 a^3$, constructed as described, have sufficient elasticity for all desired purposes, while their strength is also sufficient to insure perfect work. The pressure of the rollers can be increased or diminished by tightening or loosening the nut on the bolts $a^4$.

The bars $a\ a$ are firmly secured to a cross-bar, $b$, fixed on their under edges, and they are arranged at a suitable distance apart to give ample space for the rollers. The cross-bar $b$ is arranged so as to have the ends of the arms $a^2 a^3$ project well over the rim toward the center of the tub $c$, as shown in Fig. 3.

On the under side of the cross-bar $b$ we place the three pins $b'\ b^2$, which project vertically downward, and between which the rim of the tub $c$ is placed and secured by a wedge, $b^3$.

On the vertical pin $b^2$ we place the oval block $d$, which is held so that it has a horizontal movement on its vertical pivot, by which movement it adjusts itself to the inner curve of the tub. Besides this, its length is such as to extend over several of the staves, and prevents the pin from pressing said staves out of place.

$d'\ d'$ are the rollers by which the water is pressed from the clothing. They are journaled in the outer ends of the arms $a^2 a^3$, and are operated by a crank, $d^2$.

Our rollers may be, if desired, constructed so that they can have wound around them strips of cloth, which may be removed and dried after the wringing of the clothes is completed.

What we claim as our invention is—

In a clothes-wringer, the combination of the cross-bar $b$, provided on its under side with the pins $b'\ b'$ and $b^2$, arranged as shown, the adjustable or rotating oval block $d$, placed on the pin $b^2$, and the wedge $b^3$, as and for the purpose set forth.

In testimony that we claim the foregoing as our own we affix our signatures in presence of two witnesses.

CHARLES D. LAWRENCE.
  JOSEPH B. KERR.

Witnesses:
 H. E. FRISBIE,
 SETH WESTOVER.